(12) United States Patent
Peters

(10) Patent No.: US 9,933,592 B1
(45) Date of Patent: Apr. 3, 2018

(54) LARGE APERTURE, PASSIVE OPTICAL ATHERMALIZED BEAM EXPANDER FOR EYE-SAFE LASERS

(71) Applicant: BAE SYSTEMS INFORMATION AND ELECTRONIC SYSTEMS INTEGRATION INC., Nashua, NH (US)

(72) Inventor: Kevin W. Peters, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/411,153

(22) Filed: Jan. 20, 2017

(51) Int. Cl.
*G02B 13/00* (2006.01)
*G02B 7/02* (2006.01)
*G02B 27/09* (2006.01)

(52) U.S. Cl.
CPC ......... *G02B 7/028* (2013.01); *G02B 27/0955* (2013.01)

(58) Field of Classification Search
CPC .................................................... G02B 7/028
USPC .......................................................... 359/744
See application file for complete search history.

(56) References Cited

U.S. PATENT DOCUMENTS

| | | | |
|---|---|---|---|
| 4,205,902 A | 6/1980 | Shafer | |
| 4,475,793 A | 10/1984 | Ford | |
| 5,305,150 A | 4/1994 | Robb | |
| 5,313,333 A * | 5/1994 | O'Brien | G02B 7/028 359/811 |
| 5,414,551 A | 5/1995 | Okazaki et al. | |
| 5,532,880 A | 7/1996 | Robb | |
| 5,968,383 A | 10/1999 | Yamazaki et al. | |
| 7,729,199 B2 | 6/2010 | O'Connell | |
| 9,207,434 B2 | 12/2015 | Stayer | |

* cited by examiner

*Primary Examiner* — James Jones
(74) *Attorney, Agent, or Firm* — Davis & Bujold, PLLC

(57) ABSTRACT

A passive 5x athermalized afocal beam expander comprising a housing integrally formed of a single material. Using titanium for the housing as well as lens materials having a minimal change of index of refraction over changes in temperature provides for a 5x athermalized afocal beam expander constructed to operate in a wavelength range from about 1460 nm to about 1675 nm at temperatures ranging from about −40 degrees Celsius to about +75 degrees Celsius.

20 Claims, 18 Drawing Sheets

FIG. 10

| Surface | Comment | Type | Radius (mm) | Thickness (mm) | Material | Diameter (mm) | Conic |
|---|---|---|---|---|---|---|---|
| Stop | Lens 6 | STANDARD | 66.04 | 6.994 | CLEARTRAN | 54.0 | 0 |
| 2 | Lens 6 | STANDARD | 256.30 | 0.634 | | 51.0 | 0 |
| 3 | Lens 5 | STANDARD | 33.59 | 7.872 | CLEARTRAN | 48.0 | 0 |
| 4 | Lens 5 | STANDARD | 50.54 | 0.618 | | 45.0 | 0 |
| 5 | Lens 4 | STANDARD | 53.37 | 7.191 | SILICON | 44.0 | 0 |
| 6 | Lens 4 | STANDARD | 28.71 | 48.233 | | 36.0 | 0 |
| 7 | Field Stop | STANDARD | Infinity | 7.219 | | 4.0 | 0 |
| 8 | Lens 3 | STANDARD | -7.403 | 1.63 | SILICON | 7.0 | 0 |
| 9 | Lens 3 | STANDARD | -24.664 | 0.171 | | 9.0 | 0 |
| 10 | Lens 2 | STANDARD | -21.232 | 2.669 | CLEARTRAN | 9.4 | 0 |
| 11 | Lens 2 | STANDARD | -6.202 | 0.2 | | 10.2 | 0 |
| 12 | Lens 1 | STANDARD | -30.897 | 1.6 | CLEARTRAN | 11.0 | 0 |
| 13 | Lens 1 | STANDARD | -19.295 | 2 | | 12.0 | 0 |

| Surface | Comment | Type | Radius (mm) | Thickness (mm) | Material | Diameter (mm) | Conic | 4th order term | 6th order term |
|---|---|---|---|---|---|---|---|---|---|
| Stop | Lens 32 | STANDARD | 63.01 | 7.085 | CLEARTRAN | 54.0 | 0 | | |
| 2 | Lens 32 | EVEN ASPHERE | 271.51 | 0.477 | | 54.0 | 0 | 2.99E-07 | -2.08E-11 |
| 3 | Lens 31 | STANDARD | 22.96 | 10.773 | CLEARTRAN | 42.0 | 0 | | |
| 4 | Lens 31 | STANDARD | 33.2 | 0.477 | | 39.0 | 0 | | |
| 5 | Lens 30 | STANDARD | 29.06 | 5.356 | SILICON | 36.0 | 0 | | |
| 6 | Lens 30 | STANDARD | 13.34 | 39.46 | | 22.0 | 0 | | |
| 7 | Field Stop | STANDARD | Infinity | 5.4 | | 4.0 | 0 | | |
| 8 | Lens 29 | STANDARD | -2.571 | 1.519 | SILICON | 4.5 | 0 | | |
| 9 | Lens 29 | STANDARD | -6.15 | 0.197 | | 7.6 | 0 | | |
| 10 | Lens 28 | STANDARD | -6.694 | 2.236 | CLEARTRAN | 7.6 | 0 | | |
| 11 | Lens 28 | STANDARD | -5.003 | 0.199 | | 9.0 | 0 | | |
| 12 | Lens 27 | EVEN ASPHERE | -66.51 | 1.846 | CLEARTRAN | 12.4 | 0 | -2.15E-05 | 3.86E+08 |
| 13 | Lens 27 | STANDARD | -13.07 | | | 12.4 | 0 | | |

FIG. 18

LARGE APERTURE, PASSIVE OPTICAL ATHERMALIZED BEAM EXPANDER FOR EYE-SAFE LASERS

FIELD OF THE DISCLOSURE

The present disclosure relates to laser optics and more particularly to large aperture, optical beam expanders for eye-safe laser applications that are insensitive to temperature fluctuations across a wide range of temperatures.

BACKGROUND OF THE DISCLOSURE

Beam expanders are a type of optical device that expands the size of a collimated beam of light. In some cases, beam expanders are used as intracavity or extracavity components for lasers. Some beam expanders are telescopic in nature. These telescopic beam expanders can be refractive or reflective telescopes. In tunable laser resonator applications, intracavity beam expansion can illuminate the entire width of a diffraction grating and reduce beam divergence. This effect can enable the emission of very narrow linewidths, for example, for use in analytical applications such as laser spectroscopy. In laser propagation applications, extracavity beam expansion can be used to minimize the divergence of the laser illumination. This effect maximizes the laser energy over longer path lengths which, for example, improves the performance of remote sensing applications such as direct detection and coherent laser radars.

Current beam expanders are rather large and difficult to manufacture, The size of current system makes them unsuited for some applications where space is at a premium. Other refractive beam expanders, with a 5x magnification have an overall length from 275 mm to as long as 375 mm. Some applications require optical systems that do not obscure any portion of the laser beam. Some reflective systems, obscure the laser beam. In other eases, the application, such as scanning systems, requires an external entrance or exit pupil. Some beam expanders, specifically Galilean telescope designs, do not provide an external pupil location. Current systems also have difficulty operating consistently in harsh temperature conditions. There are some applications that require diffraction limited performance over temperature ranges from −40 degrees Celsius to +75 degrees Celsius. Existing beam expanders are not designed for these harsh temperatures.

SUMMARY OF THE DISCLOSURE

Wherefore it is an object of the present disclosure to overcome the above- mentioned shortcomings and drawbacks associated with the conventional beam expanders.

One aspect of the present disclosure is a beam expander design consisting of all refractive components. The refractive design in the present disclosure is a Keplarian telescope in its form with an input lens assembly and an objective lens assembly. Another aspect of the present disclosure is a beam expander design with a 5x magnification which provides diffraction limited performance over the wavelength band of about 1460 nm to about 1675 nm. The present disclosure is designed to operate in harsh thermal conditions from −40 to +75 degrees Celsius while maintaining the required performance. Another aspect of the present disclosure is a compact design that has a maximum center thickness of less than 85 millimeters.

In one embodiment, the beam expander uses Silicon and Cleartran as the refractive components. These components are used in two separate lens groups, 8 and 10. These high refractive index materials minimize the overall length of the beam expander. In one embodiment, the Titanium alloy 6A1-4V is used for the housing material to maintain diffraction limited performance in harsh thermal environments. The f-number of one embodiment of the present disclosure is about f/1.55, and this f-number reduces the overall length of the system. In another embodiment, the f-number is about f/1.75. In one embodiment of the beam expander, lens groups 8 and 10 are both telephoto objectives. A telephoto objective has an overall length that is less than the effective focal length. In another embodiment, lens groups 34 and 36 are telephoto objectives.

Another aspect of the present disclosure is a passive 5x athermalized afocal beam expander comprising a housing integrally formed of a single material and having an overall length; a receive lens group having at least a first, a second, and a third lens comprising materials that have a change of index of refraction over change in temperature such that the change in focus position matches the change in the housing length due to the housing coefficient of thermal expansion; and an objective lens group having at least a fourth, a fifth, and a sixth lens comprising materials that have a change of index of refraction over change in temperature such that the change in focus position matches the change in the housing length due to the housing coefficient of thermal expansion, thereby forming a passive 5x athermalized afocal beam expander constructed to operate in a wavelength range at temperatures ranging from about −40 degrees Celsius to about +75 degrees Celsius and maintaining diffraction limited performance, where the peak to valley wavefront error is less than about 0.25 waves over the temperature range.

One embodiment of the passive 5x athermalized afoul beam expander is wherein the single material of the housing is titanium 6AI-4V. In some embodiments, the third and fourth lenses comprise silicon and have a negative meniscus shape. In some cases, the first and second lenses comprise Cleartran and the fifth and sixth lenses comprise Cleartran. In other cases, the first and second lenses have a positive meniscus shape and the fifth and sixth lenses have a positive meniscus shape.

In certain embodiments of the passive 5x athermalized afocal beam expander an output beam diameter is about 50 millimeters. In some cases, the overall length of the housing is less than about 100 millimeters. In other embodiments, the passive 5x athermalized afocal beam expander has an f-number ranging from about 1.5 to about 1.75 and operates in a wavelength range from about 1460 nm to about 1675 nm. In certain embodiments, at least one of the first, second, third, fourth, fifth, or a sixth lens is aspherical.

Yet another aspect of the present disclosure is a passive 5x athermalized afocal beam expander comprising an integrally formed titanium housing having an overall length; a receive lens group having at least a first, a second, and a third lens each comprising silicon or Cleartran; and an objective lens group having at least a fourth, a fifth, and a sixth lens each comprising silicon or Cleartran, thereby forming a passive 5x athermalized afocal beam expander constructed to operate in a wavelength ranging from about 1460 nm to about 1675 nm at temperatures ranging from about −40 degrees Celsius to about +75 degrees Celsius.

One embodiment of the passive 5x athermalized afocal beam expander is wherein the titanium of the housing is titanium 6A1-4.V. In some cases, the third and fourth lenses comprise silicon and have a negative meniscus shape. In some cases, the first, second, fifth, and sixth lenses comprise Cleartrart. In one example, the first, second, fifth and sixth lenses have a positive meniscus shape.

In another embodiment of the passive 5x athermalized afocal beam expander the output beam diameter is about 50 millimeters. In some cases, the overall length of the housing is less than about 100 millimeters.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 10 provides a table of the lens and material details for one embodiment of the present disclosure as shown in FIG. 2.

FIG. 18 provides a table of the lens and material details for one embodiment of a beam expander of the present disclosure as shown in FIG. 11.

DETAILED DESCRIPTION OF THE DISCLOSURE

One aspect of the beam expander of the present disclosure is a telescope for transmitting and receiving laser radiation. In some cases, the telescope is optimized for the Dense Wavelength Division Multiplexing (DWDM) laser wavelength bands. The beam expander of the present disclosure operates over eye-safe laser wavelengths, and more specifically in the 1460-1530 nm, S-band, the 1530-1565 nm, C-band, the 1565-1625 nm, L-band, and the 1625-1675 nm, U-band, regions of DWDM bands, The present disclosure provides diffraction limited performance over the wavelength range of 1460- 1675 um. Additionally, by using all spherical surfaces on the various lenses, the cost of the system can be kept to a minimum and tolerances can be looser, making alignment easier.

It is understood that there is a need for a 5x afocal beam expander with a large output aperture. An afocal beam expander is a device that receives an input of collimated light, and outputs collimated light. Typically, the output beam size is increased. In one example, the output aperture of a beam expander of the present disclosure is greater than about 50 millimeters in diameter. This system is useful in all laser based applications that require a laser output beam up to 50 millimeters in diameter. Another aspect the beam expander of the present disclosure is that it is an afocal telescope. An afocal telescope is one that receives collimated light at the input and provides collimated light at the output. The telescope of the present disclosure can also be used to lengthen the effective focal length of a focusing lens assembly. For a camera focal length of $f_1$, the addition of the present telescope provides a new system focal length of $f_2$, where $f_2 = M * f_1$, where M is the magnification of the afocal telescope. in the present disclosure, M, the magnification, is 5x. Therefore, the present disclosure increases the effective focal length of camera lens system by 5x. The angular resolution, theta, of a typical camera system is $\tan(\theta) = h/f_2$, where h is the pixel size. Since theta is typically small, this equation can be approximated with the following equation, theta $= h/f_2$. A smaller value of theta corresponds to greater resolution for the system. In this aspect, the current beam expander could be used to improve the resolution of near-infrared cameras and associated lenses by a factor of 5.

Figure 2:
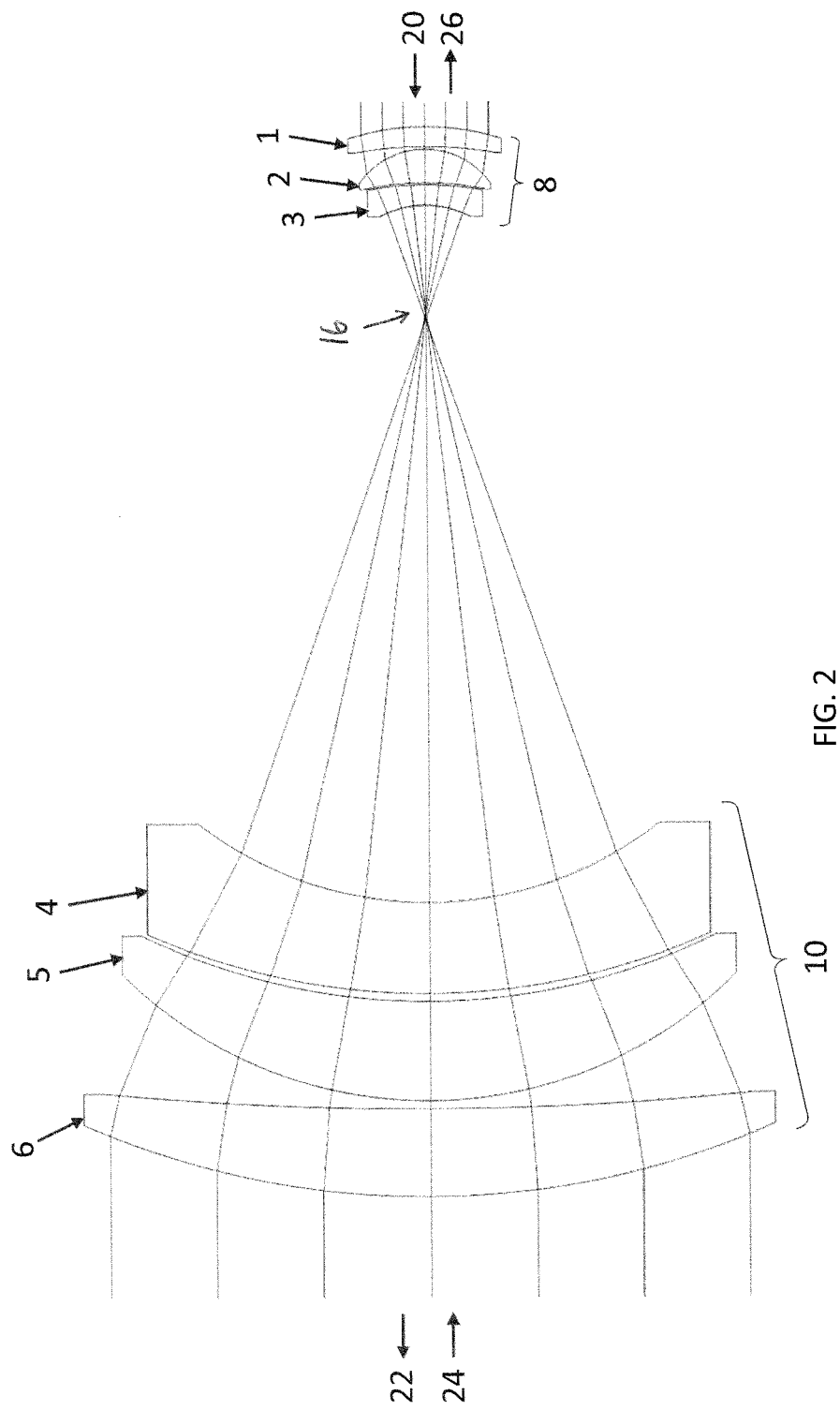
FIG. 2 shows a schematic of one embodiment of the lenses of the beam expander of the present disclosure when exposed to a beam of radiation.

In some cases, the beam expander maintains laser collimation over a wide range of temperatures without the need to adjust any of the lens groups. The beam expander of the present disclosure provides diffraction limited performance for all input fields from about 0 to about 0.185 degrees, symmetrically about the optic axis, for a beam traveling from 26 to 24 as shown in FIG. 2. For a beam traveling from 20 to 22 as shown in FIG. 2, the acceptance input angles are about 0 to about 0.925 degrees, symmetrically about the optic axis. This diffraction limited performance is maintained from −40 degrees Celsius to +75 degrees Celsius while using only a single housing material. In some cases, the peak to valley wavefront error is less than about 0.25 waves over the temperature range In certain embodiments of the beam expander, the maximum length from the first optic to the final optic is less than 85 mm. This is considerably more compact that traditional systems. For example, conventional beam expanders with two inch input apertures are longer than 225 mm for 5x magnifications. In contrast the 5x system of the present disclosure has an overall length of less than about 100 millimeters, including the housing. There, the maximum center thickness length, including a quarter waveplate is about 97 mm, or 3.8 inches. For the embodiment in FIG. 2, the maximum center thickness from lens 1 to lens 6 is less than 85 millimeters. The overall length of the system is minimized by lens groups 8 and 10. The f/number of each individual group, 8 and 10, is about f/1.55. This fast f/number allows for a lower overall length, but it becomes more difficult to control the aberrations. In the present disclosure, diffraction limited performance is maintained at this f/number. in other embodiments, the f/number is about f/1.75.

In one embodiment of the system of the present disclosure, there are two separate lens groups comprising six lens elements. This design incorporates only two types of lens materials and uses all spherical surfaces to achieve diffraction limited performance. In one example, Cleartran and silicon are used for the lens materials because the combined change in the focus position, due to the dn/dt (change of index of refraction over change in temperature) properties of the materials, compensates for the growth housing material due to its coefficient of thermal expansion (CTE). In some cases, zinc sulfides, zinc selenides and the like can also be used as lens materials so long as the materials exhibit similar properties. In one embodiment, the apparatus comprises a single housing material. For example, the single housing material can be titanium, in other cases, certain types of graphite can be used for the housing. The combination of a particular housing material along with the combination of Cleartran and silicon lenses allows the beam expander of the present disclosure to maintain diffraction limited performance over a large temperature range.

Most conventional optical systems use dissimilar housing materials to achieve passive mechanical athermalization. Optical designs of this type typically require the use of three separate housing materials. The use of multiple materials makes the designs very difficult and expensive to build. The present design maintains diffraction limited performance through the use of one housing material, and therefore improves manufacturability. By using the specific combination of silicon and Cleartran for optical materials and titanium, graphite, or the like for the housing, the design operates over a wide range of temperatures.

Figure 1:
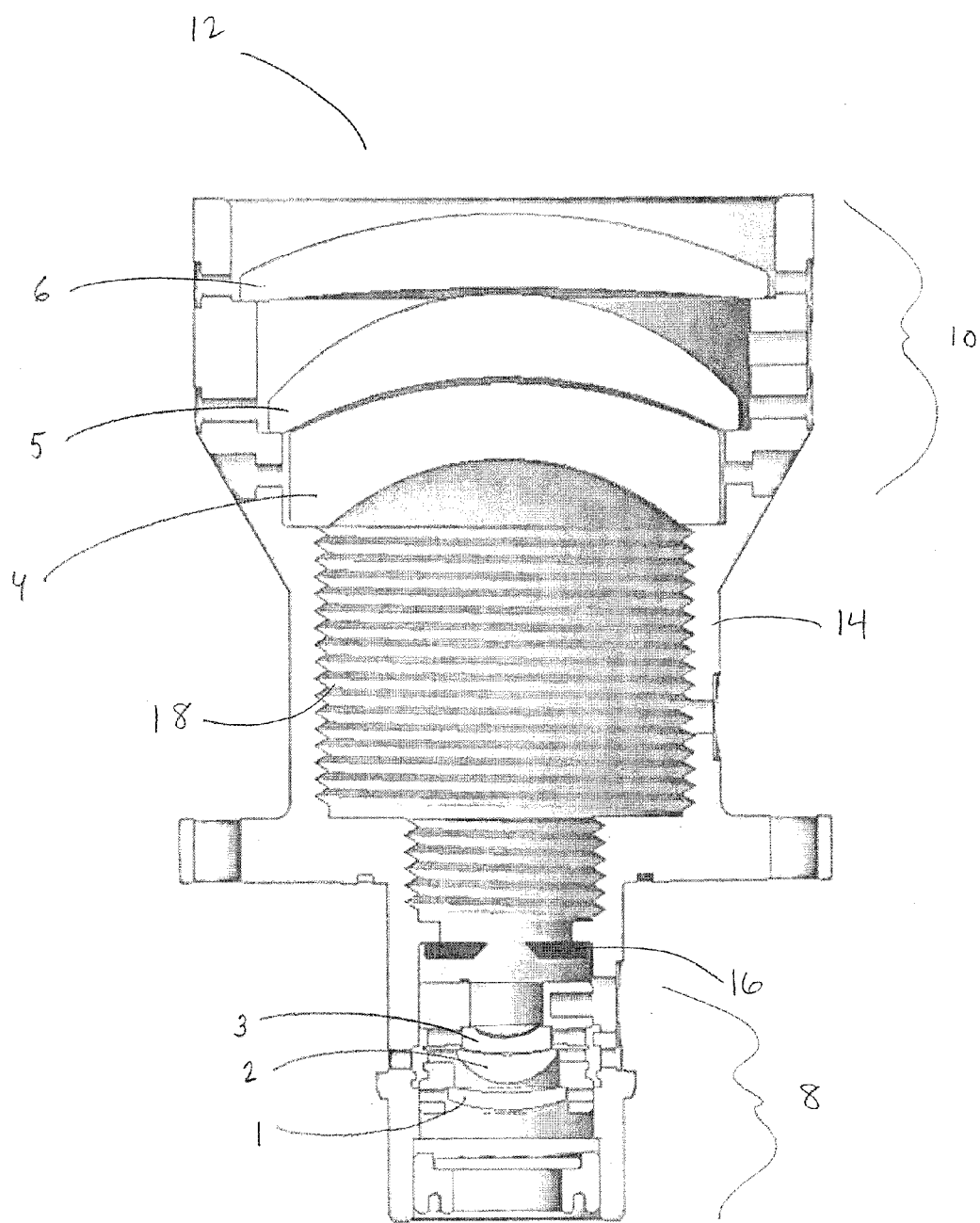
FIG. 1 shows a cross section of one embodiment of a beam expander of the present disclosure.

Referring to FIG. 1, a cross section of one embodiment of a beam expander of the present disclosure is shown. More specifically, the beam expander 12 has two lens groups; an objective lens group 10 and a receive lens group 8. The receive lens group 8 comprises three lenses 1, 2, and 3 and the objective lens group 10 comprises three lenses, 4, 5, and 6. In one embodiment of the beam expander, the first receive lens 1 comprises Cleartran and has a positive meniscus shape; the second receive lens 2 comprises Cleartran and has a positive meniscus shape; and the third receive lens 3 comprises silicon and has a negative meniscus shape. In another embodiment of the beam expander, the first objective lens 4 comprises silicon and has a negative meniscus shape; the second objective lens 5 comprises Cleartran and has a positive meniscus shape; and the third objective lens 6 comprises Cleartran and has a positive meniscus shape. In one embodiment of the beam expander, there are one or more lenses that are aspheric in nature.

Still referring to FIG. 1, the housing 14 is made of a single material, such as titanium. In one example, a titanium alloy such as titanium 6A1-4V is used. There, small amounts of aluminum and vanadium, typically 6% and 4% respectively, by weight are added to the titanium. These A1-V titanium alloys are sometimes referred to as alpha and beta alloys and are known for being metastable and heat treatable. In certain embodiments, an alternate material for the housing could be certain forms of graphite that have similar thermal expansion properties to Titanium. The use of graphite would reduce the overall weight of the beam expander and maintain performance over temperature. As seen in the Figure, the interior of the housing is generally threaded 18 to improve stray light rejection.

Referring to FIG. 2, a schematic of one embodiment of the lenses of the beam expander of the present disclosure when exposed to a beam of radiation is shown. More specifically, the beam expander has two lens groups; an objective lens group 10 and a receive lens group 8. The receive lens group comprises three lenses 1, 2, and 3 and the objective lens group comprises three lenses, 4, 5, and 6. A radiation beam 20 passes through the series of receive lenses 1, 2, and 3, and converge as in a Keplerian telescope and are internally focused for the field stop 16, such that the beam then passes through the series of objective lenses 4, 5, and 6 to result in an expanded beam 22. In one example, the output laser beam has a $1/e^2$ diameter of about 42.5 mm, or about 1.67 inches, and the objective lens clear aperture diameter is about 50 mm, or about 1.97 inches. There, the fill angle field of view, and hence the pointing change possible for the laser beam, on the objective side is about 6.4 mrad, or 0.37 degrees, full angle. In certain embodiments, the f/# (f-number) of the present beam expander is faster than other 5x afocal telescopes, e.g., at f/1.55.

In the embodiment shown in FIG. 2, the objective group, lens group 10, has an effective focal length of less than about 78 mm with a clear aperture of about 50 mm. The maximum center thickness from lens 6 to the focus location, 16, is less than about 71 millimeters. Since the distance to the focus is less than the focal length of the lens, the objective lens group 10 is a telephoto objective. The use of a telephoto objective minimizes the total overall length of the beam expander. All three lenses in this group (lenses 6, 5, and 4) are meniscus in shape. In this embodiment, the edge diameter of lens 6 is about 54.0 mm, and its center thickness is less than about 7.0 mm. Here, the material of lens 6 is Cleartran or zinc sulfide. Lens 5, in this embodiment, has an edge diameter of about 51.0 mm, and its center thickness is less than about 7.9 mm. The material of lens 5 is Cleartran or zinc sulfide. The final lens in group 10 is lens 4. The edge diameter of lens 4 is about 45.0 mm, and the center thickness of this lens is less than 7.2 mm. The material of lens 4 in this embodiment is silicon.

The receive group is lens group 8, and this lens group consists of three meniscus shaped lenses. The focal length of receive lens group 8 is less than about 15.6 mm. With this focal length for the receive lens group, the ratio of the focal length of lens group 10 to the focal length of lens group 8 is 78.0 mm divided by 15.6 mm, which is a value of 5. Hence, the magnification of the beam expander is 5x. Lens group 8 consists of lenses 1, 2, and 3. For lens 1, the edge diameter is about 12.0 mm, and the center thickness is less than about 1.6 millimeters. The material of lens 1 and lens 2 is Cleartran or zinc sulfide. The edge diameter of lens 2 is about 10.2 millimeters, and lens 2 has a center thickness of less than 2.7 millimeters. For lens 3, the material is silicon. Lens 3 has an edge diameter of about 9.0 millimeters, and it has a center thickness of less than 1.65 millimeters.

In certain embodiments of the present disclosure, all six lenses of the beam expander, lenses 1-6, have a flat edge machined on the concave side of the lens for consistent mounting. FIG. 10 provides the details of lenses 1-6 in a tabular format for one embodiment of the system. During the build process, the distance between lens group 10 and lens group 8 is adjusted to ensure that a collimated input beam maintains collimated at the output.

Still referring to FIG. 2, laser radiation can be received or transmitted by the beam expander. When the laser light travels from 20 to 22, the laser beam impacts lens 1 first. Once the laser beam reaches lens 6, the size of the laser beam is expanded by a factor of 5. Normally, this path is considered the transmit path. When the laser light travels from 24 to 26, the size of the laser beam is reduced by 5x. When light travels in this direction, it is often called the receive path. When the beam expander is used to lengthen the focal length of camera lens system, the light travels from 24 to 26, as in the receive path ease.

Figure 3:
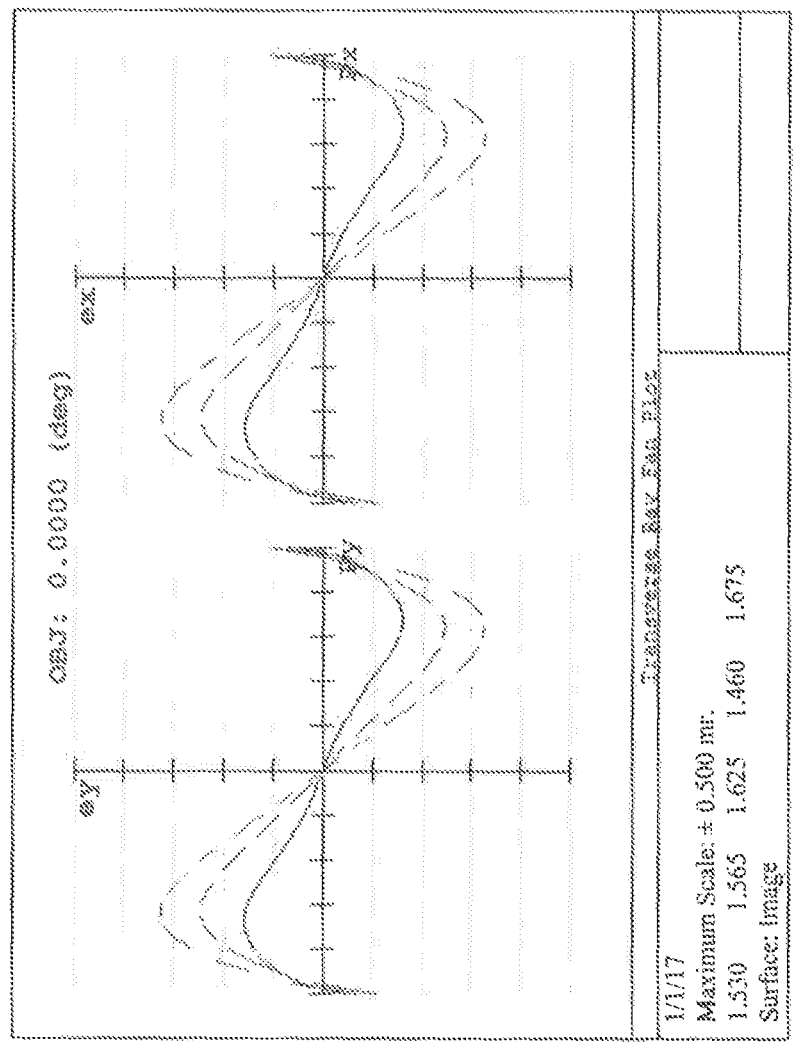
FIG. 3 shows a ray diagram plot for operation at −40 degrees Celsius for one embodiment of a beam expander of the present disclosure as shown in FIG. 2.

Referring to FIG. 3, a ray diagram plot for one embodiment of the beam expander as shown in FIG. 2 is shown for operation of the beam expander at −40 degrees Celsius. A ray diagram plot is an alternate method of looking at the wavefront performance. The independent axis of the ray diagram plot is the normalized pupil radius in the system y direction for the plot on the left, and it is labeled Py. In the plot on the right, the independent axis is the normalized pupil radius in the system x direction, and it is labeled Px. It is understood that a deviation of the wavefront formed by a telescope results in an optical aberration. These aberrations can be from a deviation from perfectly spherical - for a wavefront formed by the objective - or from perfectly flat for a wavefront formed by the eyepiece. Aberrations disturb optimum convergence of the energy to a point and result in a degradation of image quality. In FIG. 3, the ray diagram plot is for an afocal system, and the units are in milliradians. This figure shows that the beam expander maintains diffraction limited performance, with no adjustments, at −40 degrees Celsius.

Figure 4:
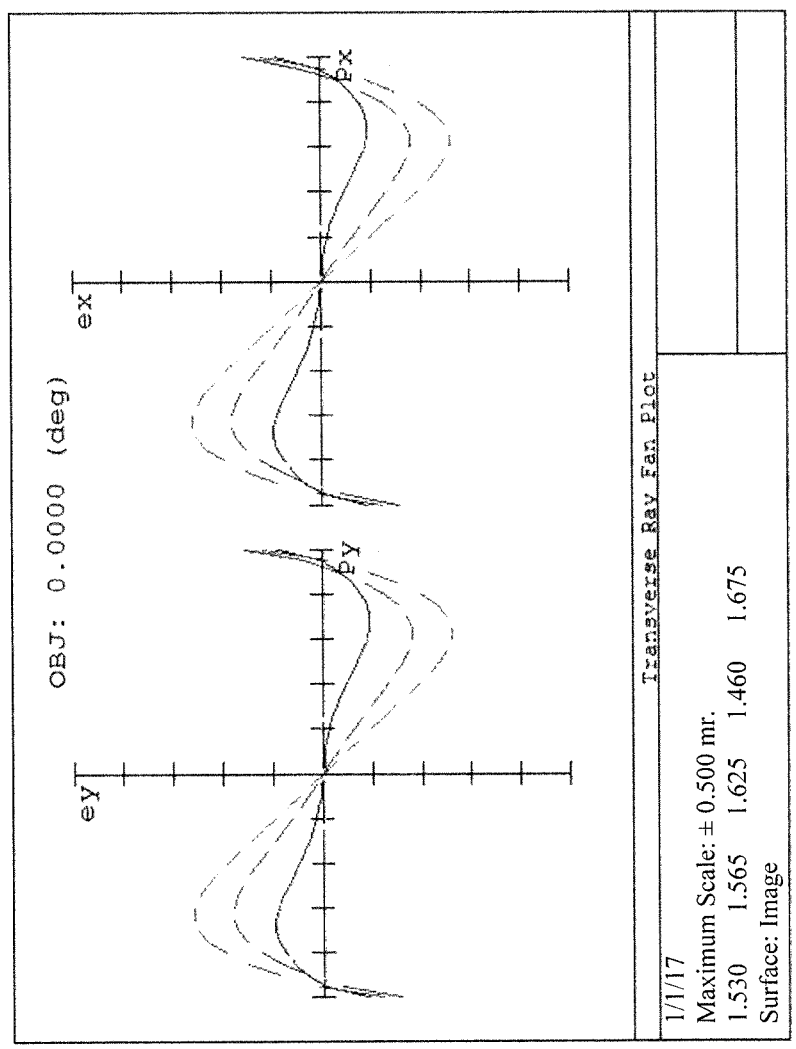
FIG. 4 shows a ray diagram plot for operation at −20 degrees Celsius for one embodiment of a beam expander of the present disclosure as shown in FIG. 2.

Referring to FIG. 4, a ray diagram plot for one embodiment of the beam expander as shown in FIG. 2 is shown for operation of the beam expander at −20 degrees Celsius. In FIG, 4, the ray diagram plot is for an afocal system, and the units are in milliradians. This figure shows that the beam expander maintains diffraction limited performance, with no adjustments, at −20 degrees Celsius.

Figure 5:
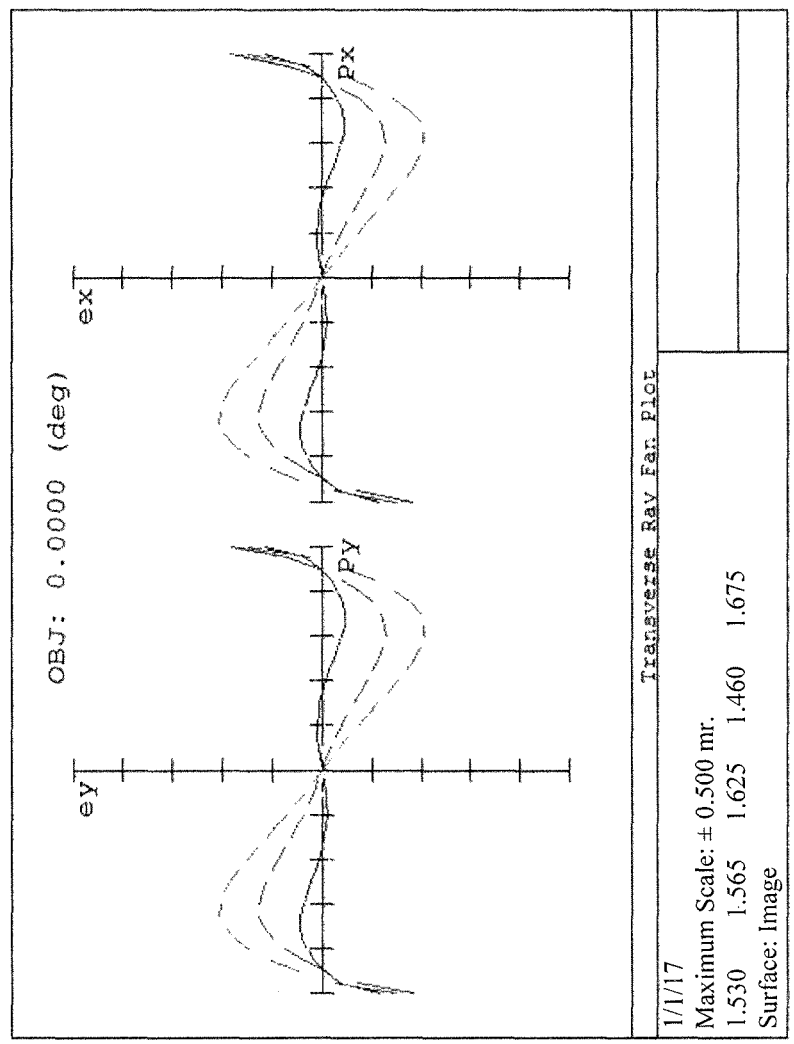
FIG. 5 shows a ray diagram plot for operation at 0 degrees Celsius for one embodiment of a beam expander of the present disclosure as shown in FIG. 2.

Referring to FIG. 5, a ray diagram plot for one embodiment of the beam expander as shown in FIG. 2 is shown for operation of the beam expander at 0 degrees Celsius. In FIG. 5, the ray diagram plot is for an afocal system, and the units are in inilliradians. This figure shows that the beam expander maintains diffraction limited performance, with no adjustments, at 0 degrees Celsius.

Figure 6:
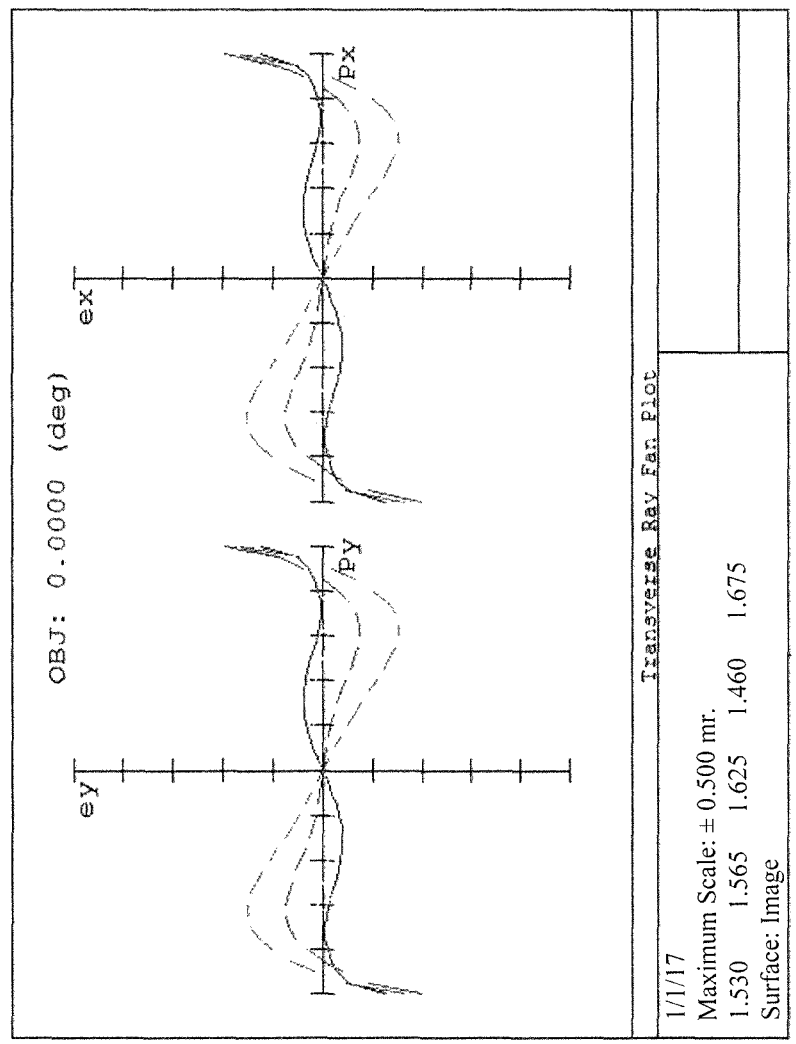
FIG. 6 shows a ray plot diagram for operation at +25 degrees Celsius for one embodiment of a beam expander of the present disclosure as shown in FIG. 2.

Referring to FIG. 6, a ray diagram plot for one embodiment of the beam expander as shown in FIG. 2 is shown for operation of the beam expander at +25 degrees Celsius. In FIG. 6, the ray diagram plot is for an afocal system, and the units are in milliradians. This figure shows that the beam expander maintains diffraction limited performance, with no adjustments, at +25 degrees Celsius.

Figure 7:
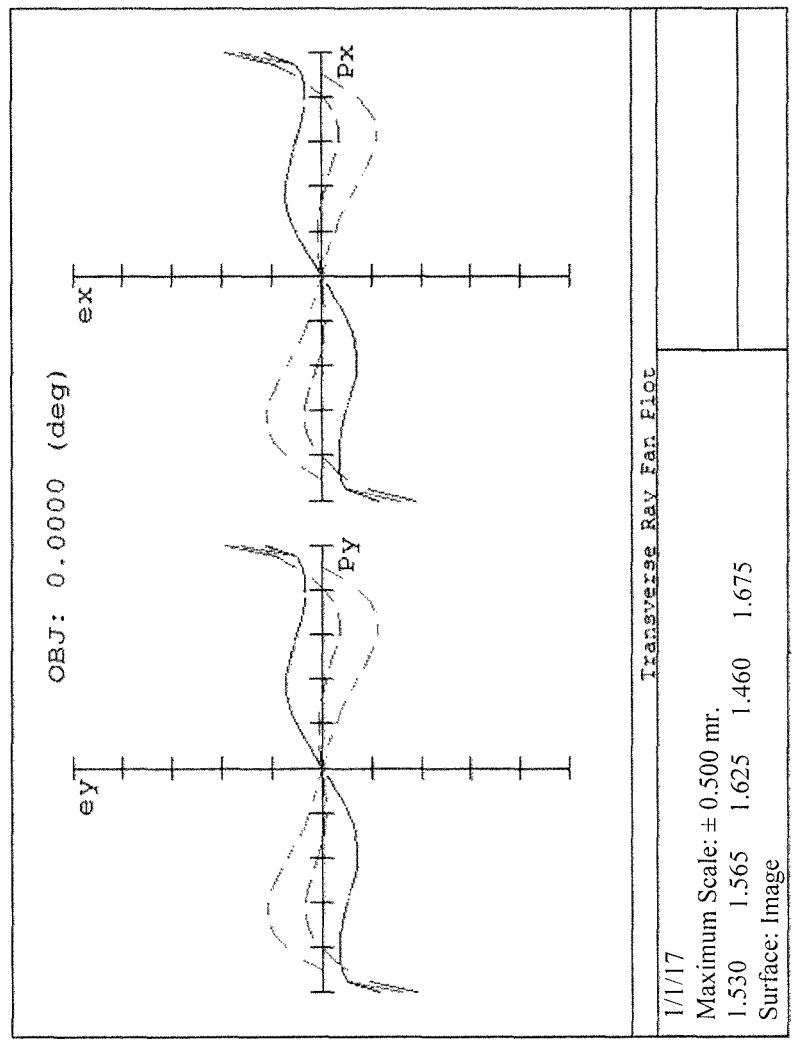
FIG. 7 shows a ray plot diagram for operation at +50 degrees Celsius for one embodiment of a beam expander of the present disclosure as shown in FIG. 2.

Referring to FIG. 7, a ray diagram plot for one embodiment of the beam expander as shown in FIG. 2 is shown for operation of the beam expander at 30 50 degrees Celsius. in FIG. 7, the ray diagram plot is for an afocal system, and the units are in milliradians. This figure shows that the beam expander maintains diffraction limited performance, with no adjustments, at +50 degrees Celsius.

Figure 8:
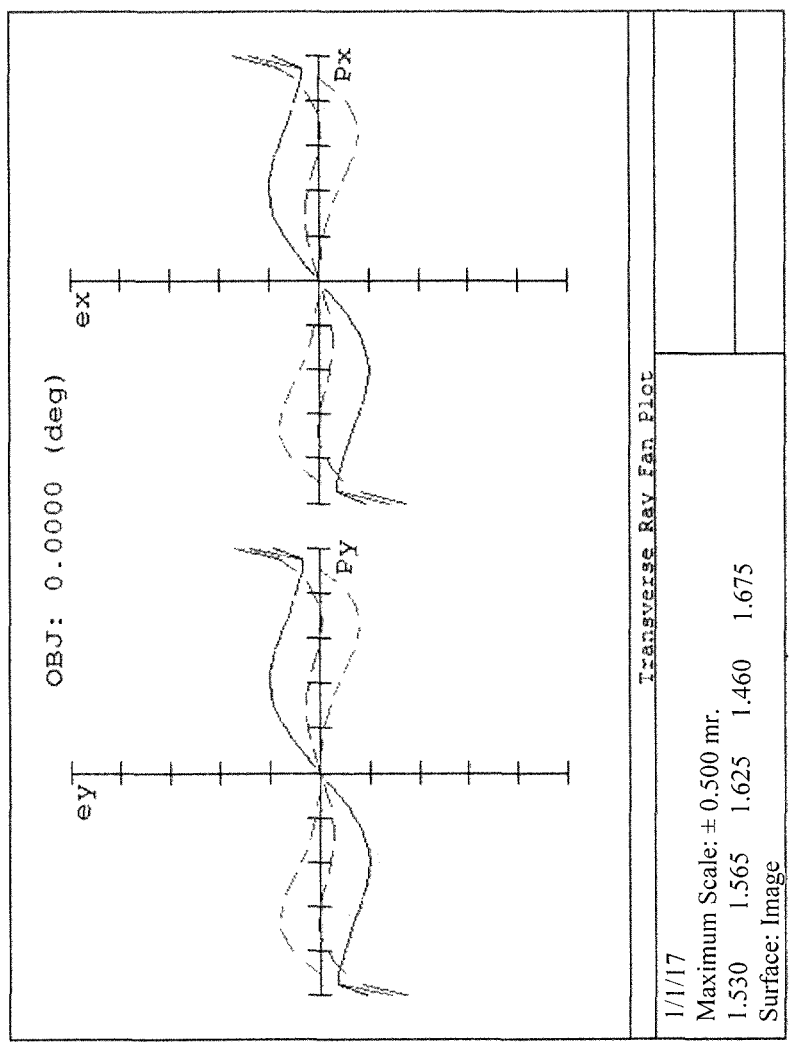
FIG. 8 shows a ray plot diagram for operation at +75 degrees Celsius for one embodiment of a beam expander of the present disclosure as shown in FIG. 2.

Referring to FIG. 8, a ray diagram plot for one embodiment of the beam expander as shown in FIG. 2 is shown for operation of the beam expander at +75 degrees Celsius. In FIG. 8, the ray diagram plot is for an afocal system, and the units are in milliradians. This figure shows that the beam expander maintains diffraction limited performance, with no adjustments, at +75 degrees Celsius.

Figure 9:
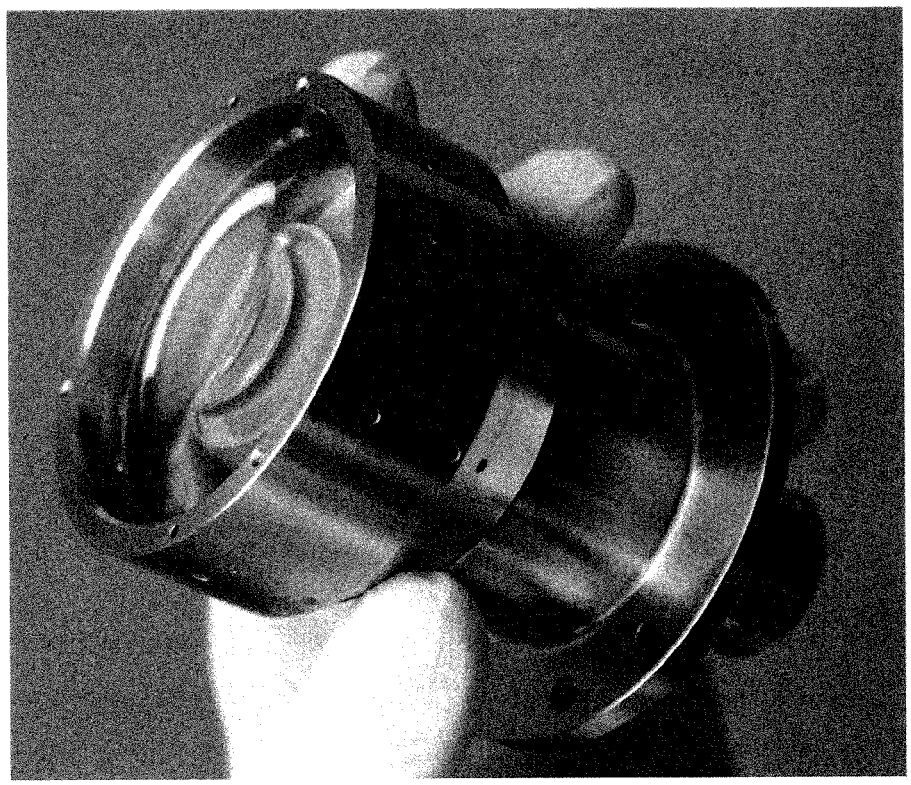
FIG. 9 shows a perspective view of one embodiment of a beam expander of the present disclosure.

Referring to FIG. 9, a perspective view of one embodiment of a beam expander of the present disclosure is shown. More particularly, this figure shows a working prototype of the beam expander. In this embodiment, the beam expander can be mounted to another structure using the through holes shown in the picture.

Figure 11:
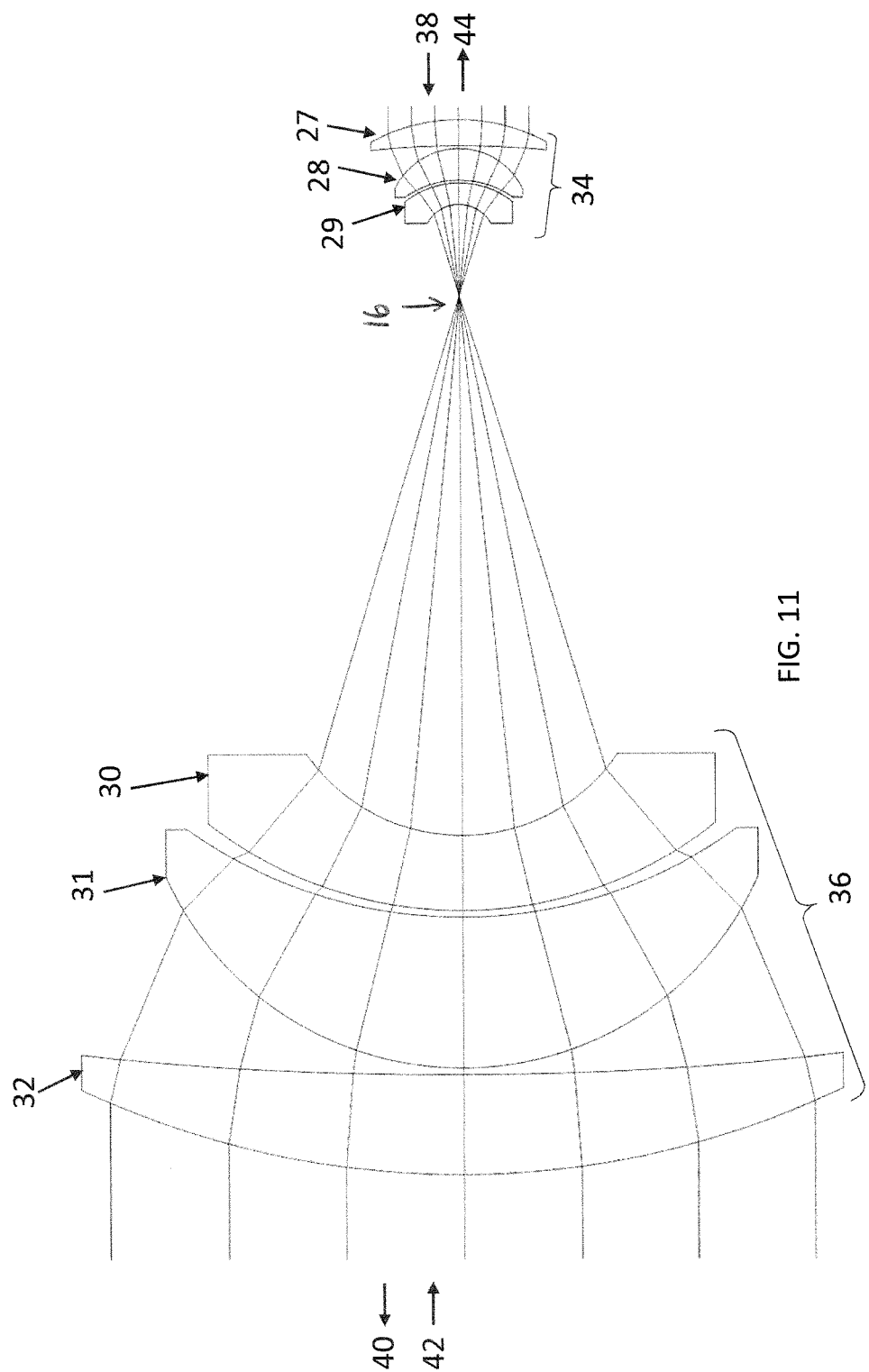
FIG. 11 shows a schematic of another embodiment of the lenses of the beam expander of the present disclosure when exposed to a beam of radiation.

Referring to FIG. 11, a schematic of another embodiment of the lenses of the beam expander of the present disclosure when exposed to a beam of radiation is shown. More specifically, the beam expander has two lens groups; an objective lens group 36 and a receive lens group 34. The receive lens group comprises three lenses 27, 28, and 29, and the objective lens group comprises three lenses, 30, 31, and 32. A radiation beam 38 passes through the series of receive lenses 27, 28, and 29, and converge as in a Keplerian telescope and are internally focused for the field stop 16, such that the beam then passes through the series of objective lenses 30, 31, and 32 to result in an expanded beam 40. In one example, the output laser beam has a $1/e^2$ diameter of about 42.5 mm, or 1.67 inches, and the objective lens clear aperture diameter is about 50 mm, or 1.97 inches. There, the full angle field of view, and hence the pointing change possible for the laser beam, on the objective side is about 6.4 mrad, or 0.37 degrees, full angle. In the embodiment of FIG. 11, the f/# (f-number) of the beam expander is about f/1.74. The objective group, lens group 36, has an effective focal length of less than 86.4 mm with a clear aperture of about 50 mm. The maximum center thickness from lens 32 to the focus location, 16, is less than 63 millimeters. Since the distance to the focus is less than the focal length of the lens, the objective lens group 36 is a telephoto objective. All three lenses in this group (lenses 32, 31, and 30) are meniscus in shape. In this embodiment, the edge diameter of lens 32 is 54.0 mm, and its center thickness is less than 7.1 mm. The material of lens 32 is Cleartran or zinc sulfide. Lens 31, in this embodiment, has an edge diameter of about 42.0 mm, and its center thickness is less than 11.0 mm. The material of lens 31 is Cleartran or zinc sulfide. The final lens in group 36 is lens 20. The edge diameter of lens 30 is about 36.0 mm, and the center thickness of this lens is less than 5.4 mm. In one embodiment, the material of lens 30 is silicon.

The receive group is lens group 34, and this lens group consists of three meniscus shaped lenses, The focal length of receive lens group 34 is less than about 17.2 mm. With this focal length for the receive lens group, the ratio of the focal length of lens group 36 to the focal length of lens group 34 is 86.4 mm divided by 17.2 mm, which is a value of 5. Hence, the magnification of the beam expander is 5x. Lens group 34 consists of lenses 27, 28, and 29. For lens 27, the edge diameter is about 12.4 mm, and the center thickness is less than 1.85 millimeters. The material of lens 27 and lens 28 is Cleartran or zinc sulfide. The edge diameter of lens 28 is about 9.0 millimeters, and lens 28 has a center thickness of less than 2.25 millimeters. For lens 29, the material is silicon. Lens 29 has an edge diameter of about 7.6 millimeters, and it has a center thickness of less than 1.52 millimeters.

Still referring to FIG. 11, transmit light in this embodiment of the beam expander enters at 38 and the expanded beam exits at 40. For radiation that is received, light enters at 42 and exits the beam expander at 44. The overall length from lens 32 to lens 27 is less than 76 millimeters for this embodiment.

Figure 12:
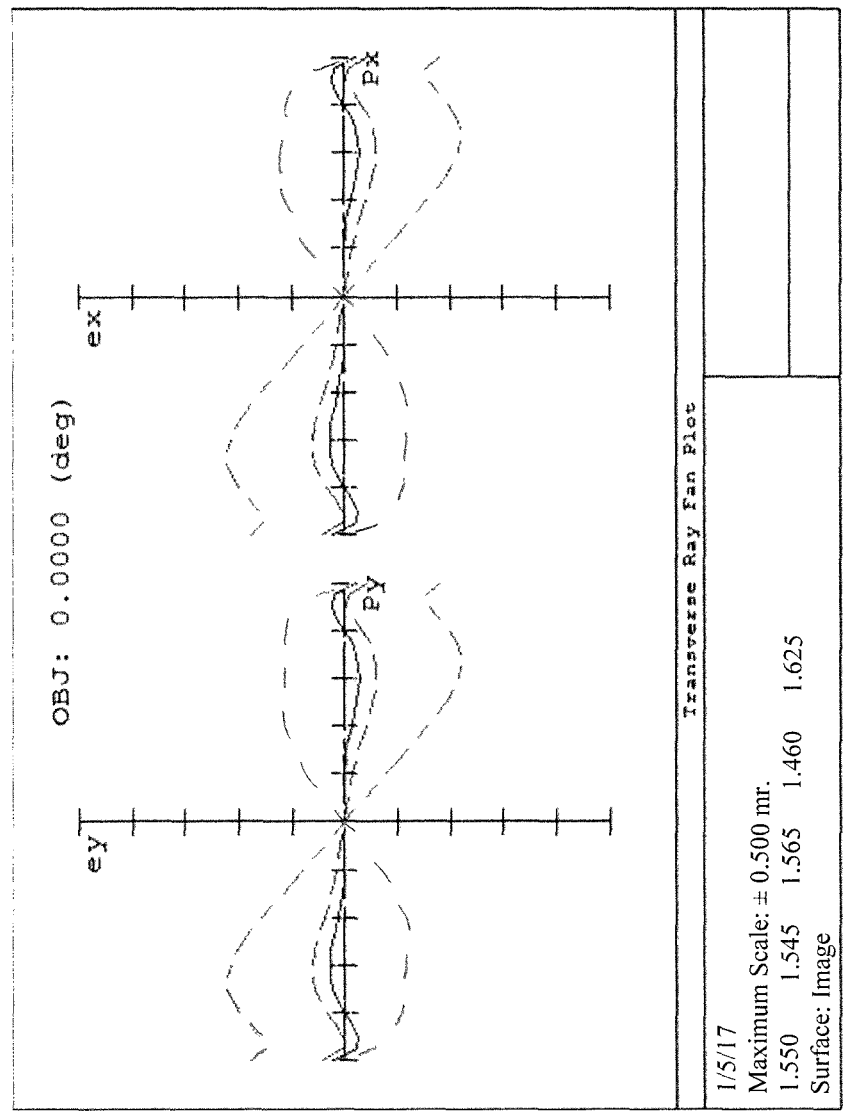
FIG. 12 shows a ray diagram plot for operation at −40 degrees Celsius for one embodiment of a beam expander of the present disclosure as shown in FIG. 11.

In FIG. 12, a ray diagram plot for one embodiment of the beam expander as shown in FIG. 11 is shown for operation of the beam expander at 31 40 degrees Celsius. In FIG. 12, the ray diagram plot is for an afocal system, and the units are in milliradians. This figure shows that the beam expander maintains diffraction limited performance, with no adjustments, at −40 degrees Celsius.

Figure 13:
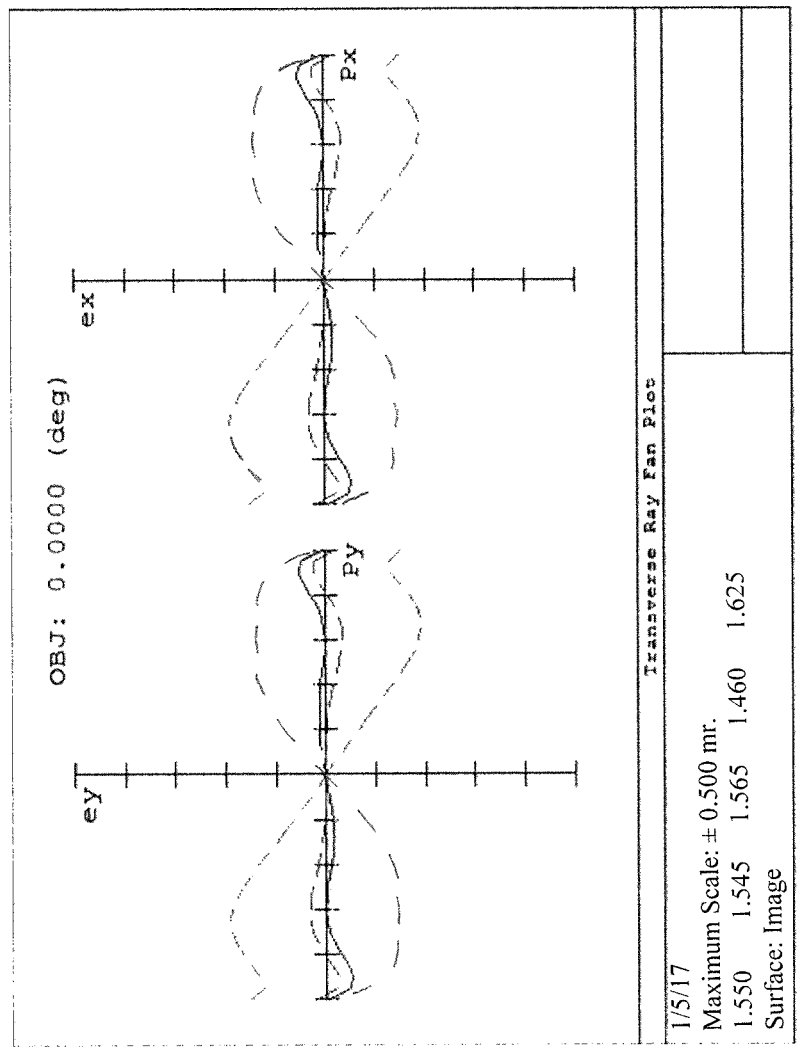
FIG. 13 shows a ray diagram plot for operation at −20 degrees Celsius for one embodiment of a beam expander of the present disclosure as shown in FIG. 11.

Referring to FIG. 13, a ray diagram plot for one embodiment of the beam expander as shown in FIG. 11 is shown for operation of the beam expander at −20 degrees Celsius. In FIG. 13, the ray diagram plot is for an afocal system, and the units are in milliradians. This figure shows that the beam expander maintains diffraction limited performance, with no adjustments, at −20 degrees Celsius.

Figure 14:
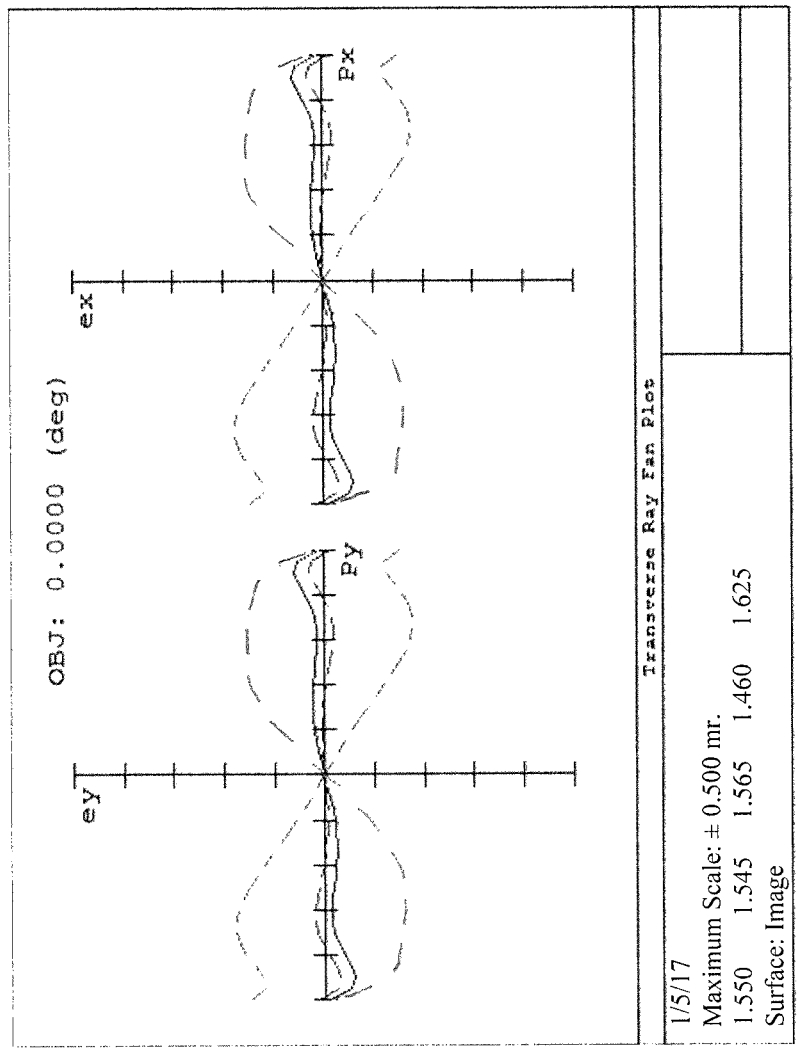
FIG. 14 shows a ray diagram plot for operation at 0 degrees Celsius for one embodiment of a beam expander of the present disclosure as shown in FIG. 11.

Referring to FIG. 14, a ray diagram plot for one embodiment of the beam expander as shown in FIG. 11 is shown for operation of the beam expander at 0 degrees Celsius. In FIG. 14, the ray diagram plot is for an afocal system, and the units are in milliradians. This figure shows that the beam expander maintains diffraction limited performance, with no adjustments, at 0 degrees Celsius.

Figure 15:
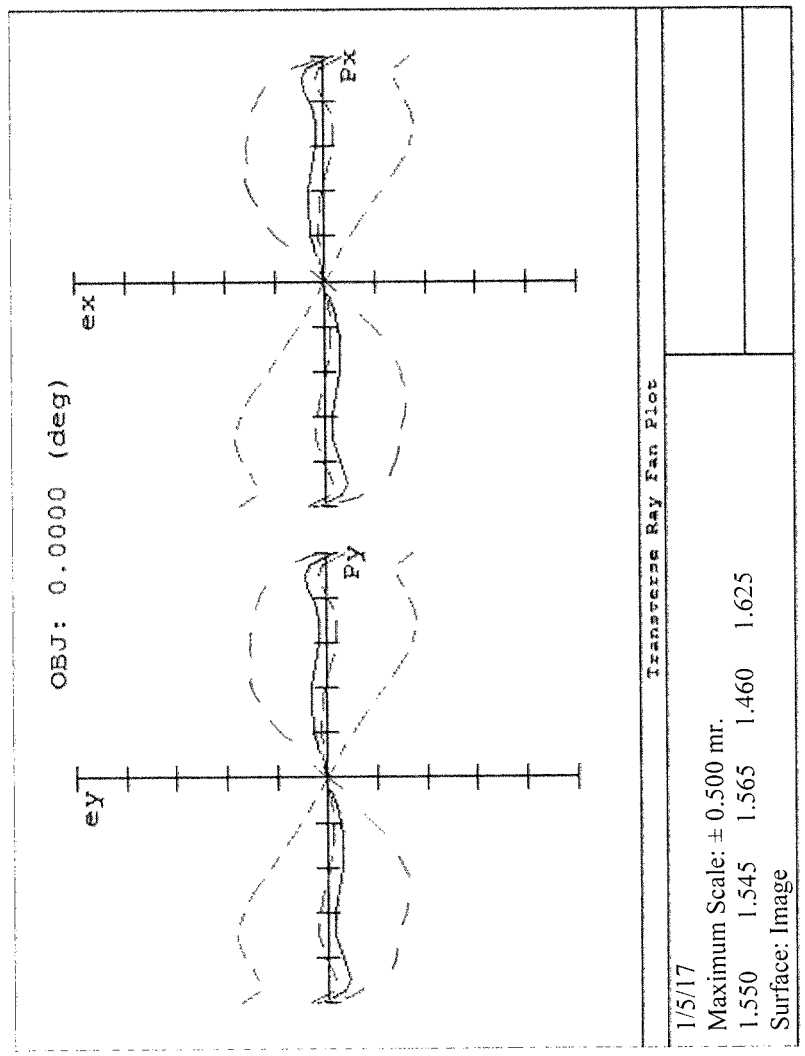
FIG. 15 shows a ray diagram plot for operation at +25 degrees Celsius for one embodiment of a beam expander of the present disclosure as shown in FIG. 11.

Referring to FIG. 15, a ray diagram plot for one embodiment of the beam expander as shown in FIG. 11 is shown for operation of the beam expander at +25 degrees Celsius. In FIG. 15, the ray diagram plot is for an afocal system, and the units are in milliradians. This figure shows that the beam expander maintains diffraction limited performance, with no adjustments, at +25 degrees Celsius.

Figure 16:
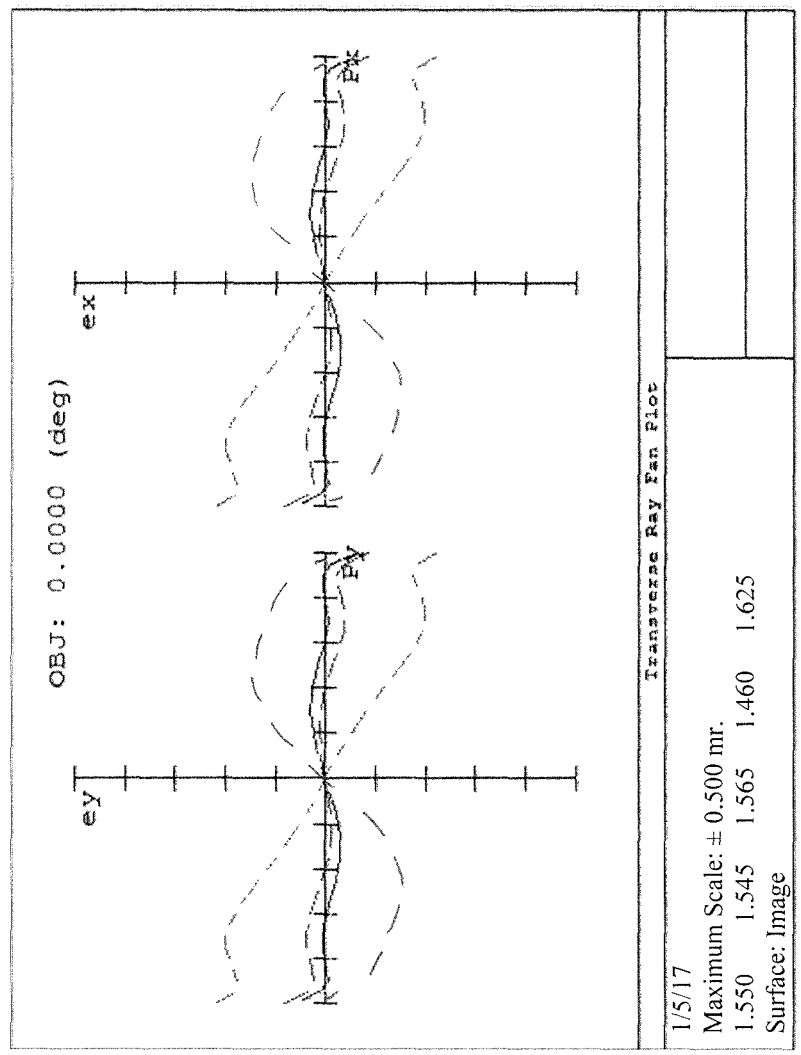
FIG. 16 shows a ray diagram plot for operation at ±50 degrees Celsius for one embodiment of a beam expander of the present disclosure as shown in FIG. 11.

Referring to FIG. 16, a ray diagram plot for one embodiment of the beam expander as shown in FIG. 11 is shown for operation of the beam expander at +50 degrees Celsius. In FIG. 16, the ray diagram plot is for an afocal system, and the units are in milliradians. This figure shows that the beam expander maintains diffraction limited performance, with no adjustments, at +50 degrees Celsius.

Figure 17:
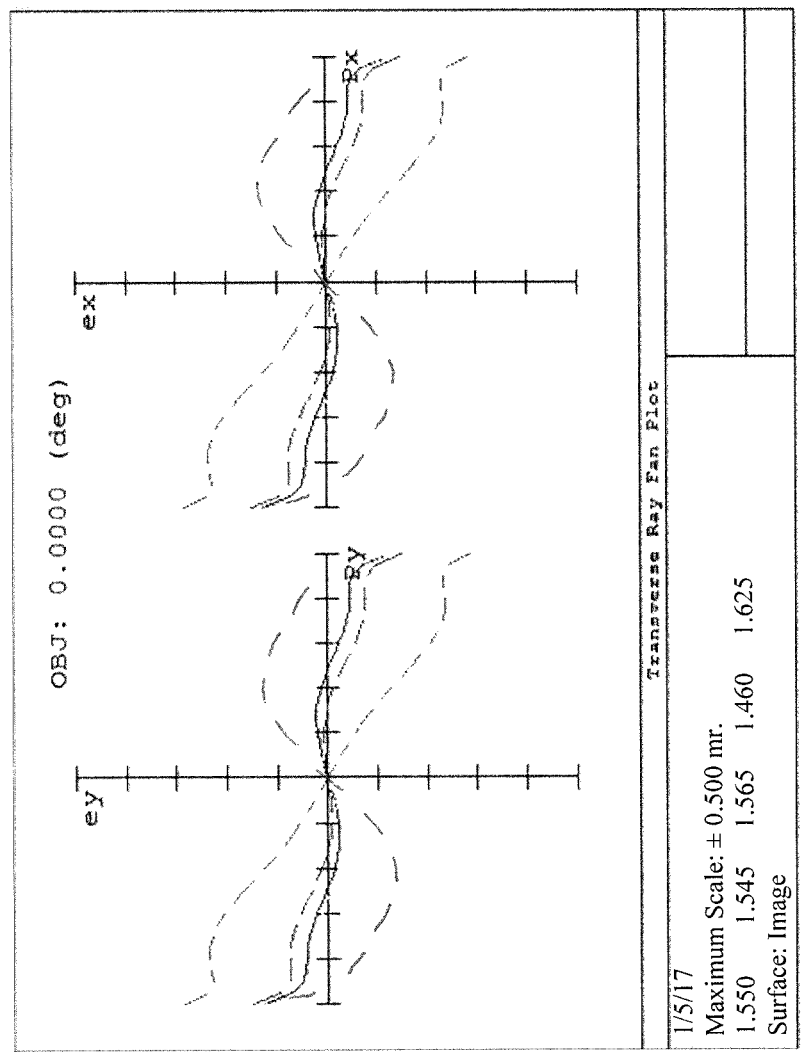
FIG. 17 shows a ray diagram plot for operation at +75 degrees Celsius for one embodiment of a beam expander of the present disclosure as shown in FIG. 11.

Referring to FIG. 17, a ray diagram plot for one embodiment of the beam expander as shown in FIG. 11 is shown for operation of the beam expander at +75 degrees Celsius. In FIG. 17, the ray diagram plot is for an afocal system, and the units are in milliradians. This figure shows that the beam expander maintains diffraction limited performance, with no adjustments, at +75 degrees Celsius.

Referring to FIG. 18, a table of the lens and material details for one embodiment of the present disclosure for example as shown in FIG. 11 is shown.

The beam expander can be utilized as the last, or first, component in a laser based system for applications that need to transmit or receive laser beams up to 50 millimeters in diameter. Examples of these types of systems are laser radar systems and laser range finder systems that operate in the 1460-1675 nm wavelength range. Using a beam expander in the current disclosure minimizes the overall size of these laser based systems since the remaining optics in the transmit and the receive portions of the system can have a 5x smaller diameter. This beam expander can also be used to improve the resolution of near-infrared camera lenses and systems by increasing the effective focal length of these systems by a factor of 5.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A passive 5x athermalized afocal beam expander comprising
   a housing integrally formed of a single material and having an overall length;
   a receive lens group having at least a first, a second, and a third lens comprising materials that have a change of index of refraction over change in temperature such that the change in focus position matches the change in the housing length due to the housing coefficient of thermal expansion; and
   an objective lens group having at least a fourth, a fifth, and a sixth lens comprising materials that have a change of index of refraction over change in temperature such that the change in focus position matches the change in the housing length,
   thereby forming the passive 5x athermalized afocal beam expander constructed to operate in a wavelength range at temperatures ranging from about −40 degrees Celsius to about +75 degrees Celsius and maintaining diffraction limited performance, where the peak to valley wavefront error is less than about 0.25 waves over the temperature range.

2. The passive 5x athermalized afocal beam expander of claim 1, wherein the single material of the housing is titanium 6A1-4V.

3. The passive 5x athermalized afocal beam expander of claim 1, wherein the third and fourth lenses comprise silicon.

4. The passive 5x athermalized afocal beam expander of claim 3, wherein the third and fourth lenses have a negative meniscus shape.

5. The passive 5x athermalized afocal beam expander of claim 1, wherein the first and second lenses comprise Cleartran.

6. The passive 5x athermalized afocal beam expander of claim 1, wherein the fifth and sixth lenses comprise Cleartran.

7. The passive 5x athermalized afocal beam expander of claim 5, wherein the first and second lenses have a positive meniscus shape.

8. The passive 5x athermalized afocal beam expander of claim 6. wherein the fifth and sixth lenses have a positive meniscus shape.

9. The passive 5x athermalized afocal beam expander of claim 1, further comprising an output beam diameter of about 50 millimeters and the overall length of the housing is less than 100 millimeters.

10. The passive 5x athermalized afocal beam expander of claim 1, wherein at least one of the first, second, third, fourth, fifth, or sixth lenses is aspherical.

11. The passive 5x athermalized afocal beam expander of claim 1, further comprising an f-number ranging from about 1.5 to about 1.75.

12. The passive 5x athermalized afocal beam expander of claim 1, wherein the wavelength range is from about 1460 nm to about 1675 nm.

13. A passive 5x athermalized afocal beam expander comprising an integrally formed titanium housing having an overall length;

a receive lens group having at least a first, a second, and a third lens each comprising silicon or Cleartran; and an objective lens group having at least a fourth, a fifth, and a sixth lens each comprising silicon or Cleartran, thereby forming a passive 5x athermalized afocal beam expander constructed to operate in a wavelength range from about 1460 nm to about 1675 nm at temperatures ranging from about −40 degrees Celsius to about +75 degrees Celsius.

14. The passive 5x athermalized afocal beam expander of claim 13, wherein the titanium of the housing is titanium 6A1-4V.

15. The passive 5x athermalized afocal beam expander of claim 13, wherein the third and fourth lenses comprise silicon.

16. The passive 5x athermalized afocal beam expander of claim 15, wherein the third and fourth lenses have a negative meniscus shape.

17. The passive 5x athermalized afocal beam expander of claim 13, wherein the first, second, fifth, and sixth lenses comprise Cleartran.

18. The passive 5x athermalized afocal beam expander of claim 17, wherein the first, second, fifth and sixth lenses have a positive meniscus shape.

19. The passive 5x athermalized afocal beam expander of claim 13, further comprising an output beam diameter of about 50 millimeters.

20. The passive 5x athermalized afocal beam expander of claim 13, wherein the overall length of the housing is less than about 100 millimeters.

* * * * *